Sept. 18, 1923.
M. O. ANTHONY
1,467,991
SELF GRINDING POPPET VALVE
Filed Sept. 25, 1920
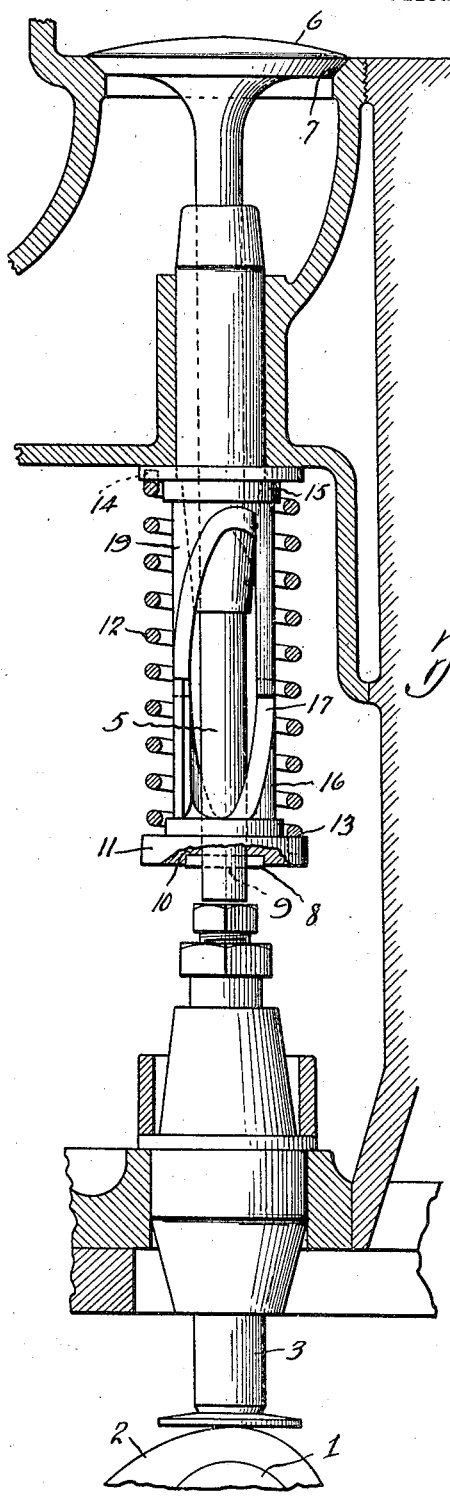
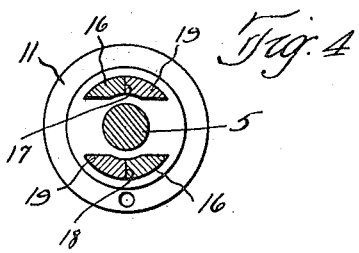
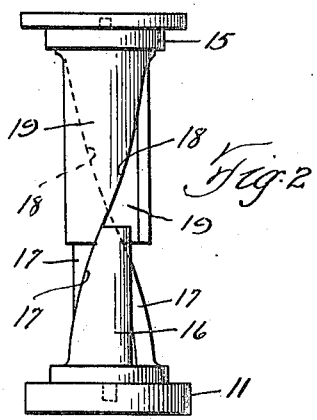
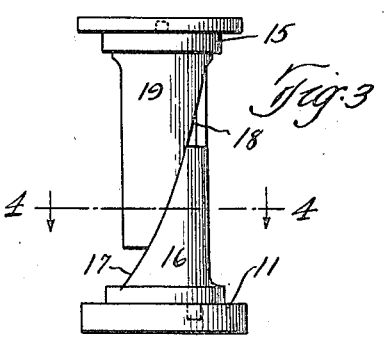
Inventor
M. O. Anthony
By John A. Bornhardt
Atty.

Patented Sept. 18, 1923.

1,467,991

UNITED STATES PATENT OFFICE.

MARCUS O. ANTHONY, OF NEW YORK, N. Y., ASSIGNOR TO CONTINENTAL ENGINEERING CORPORATION, OF OMAHA, NEBRASKA.

SELF-GRINDING POPPET VALVE.

Application filed September 25, 1920. Serial No. 412,759.

*To all whom it may concern:*

Be it known that I, MARCUS O. ANTHONY, a citizen of the United States, residing at New York city, in the county of New York and State of New York, have invented certain new and useful Improvements in Self-Grinding Poppet Valves, of which the following is a specification.

This invention relates to valves especially adapted for internal combustion engines, and has for its object to provide improved means for rotating the valve a few degrees every time it is lifted, thus causing an even wearing of the valve and valve seat, and avoiding any necessity for grinding the same. The valves referred to are poppet valves of the type ordinarily used in internal combustion engines, and the rotating device is applied to the valve stem in the manner hereinafter described.

In the accompanying drawings Fig. 1 is a vertical section thru a valve and part of a motor showing the invention applied. Fig. 2 is a side elevation of the members which cause rotation of the valve. Fig. 3 is a view similar to Fig. 2 showing the position of said members when the valve is lifted, and Fig. 4 is a section on the line 4—4 of Fig. 3.

In the drawings 1 indicates a cam shaft and 2 is a cam thereon operating a push rod 3 which works in a bushing setting in the casing of the motor. 5 is a valve stem which is operated by the push rod, 6 the valve and 7 the valve seat.

A spring seat washer 11 is mounted on the valve stem near the lower end thereof and is supported by a pin 8 extending thru the hole 9 in the valve stem and projecting at its ends in notches 10 in the under side of the washer, thereby preventing rotation of said washer with respect to the stem. A coiled spring 12 rests at its lower end on the washer 11, the end 13 of the spring being bent down and caught in a hole in the washer. The upper end of the spring is similarly attached at 14 to an upper spring seat washer 15 which rests against the adjacent part of the valve guide. The spring is in compression. Projecting from the lower washer 11, between the spring and the valve stem, is a sleeve or cam member 16 having two prongs with inclined or bevelled faces 17, and these faces are in contact with similar faces 18 on a similar sleeve or member 19.

These sleeves are made integral with or fastened to the washer members 11 and 15 and are thus rigid therewith, and the faces 17 and 18 slide in contact with each other as the valve stem lifts. The bevelled faces of the prongs form in effect cams which cause a twist or turn as the valve stem reciprocates.

On the upward stroke of the valve it is turned, against the torsion of the spring 12, by the contacting cam faces 17 and 18 of the members 16 and 19, the upper spring seat 15 remaining stationary by reason of the upward pressure and friction against the casing, but the spring seat 11 and valve stem turn slightly. On the down stroke the release of the pressure permits the seat 15 to turn slightly because of the spring torsion, while the seat 11 and valve turn back, and the valve seats in a new place.

I claim:

1. In an internal combustion engine, the combination, with a poppet valve, of a pair of spaced washers surrounding the valve stem outside of the valve guide, one of said washers being seated around the end of the valve guide and the other being non-rotatably secured to the stem, there being a pair of prongs projecting from each washer toward the other and having axially inclined contacting faces, and a helical valve seating spring interposed between the washers and surrounding the prongs, the ends of the spring being non-rotatably secured to the respective washers, and the direction of coiling the spring being such as to oppose the wedging effect of said prongs.

2. In an internal combustion engine: a poppet-valve having a valve stem guided in a valve guide; a first washer surrounding said valve stem outside said valve guide and seated around the end of said valve guide; a second washer surrounding said valve stem outside of said valve guide, non-rotatably secured to said valve stem, and spaced from said first washer; a pair of projections, one carried on each of said washers, projecting toward each other from said washers and provided with cooperating contacting faces inclined relative to the axis of said valve stem; and a helical valve seating spring interposed between said washers, surrounding said projections, rotatable with respect to said washers, and coiled in a direction to oppose the wedging effect of said projections.

In testimony whereof, I do affix my signature in presence of two witnesses.

MARCUS O. ANTHONY.

Witnesses:
 L. LOUIS MALIN,
 JOHN A. BOMMHARDT.